United States Patent Office 3,509,773
Patented May 5, 1970

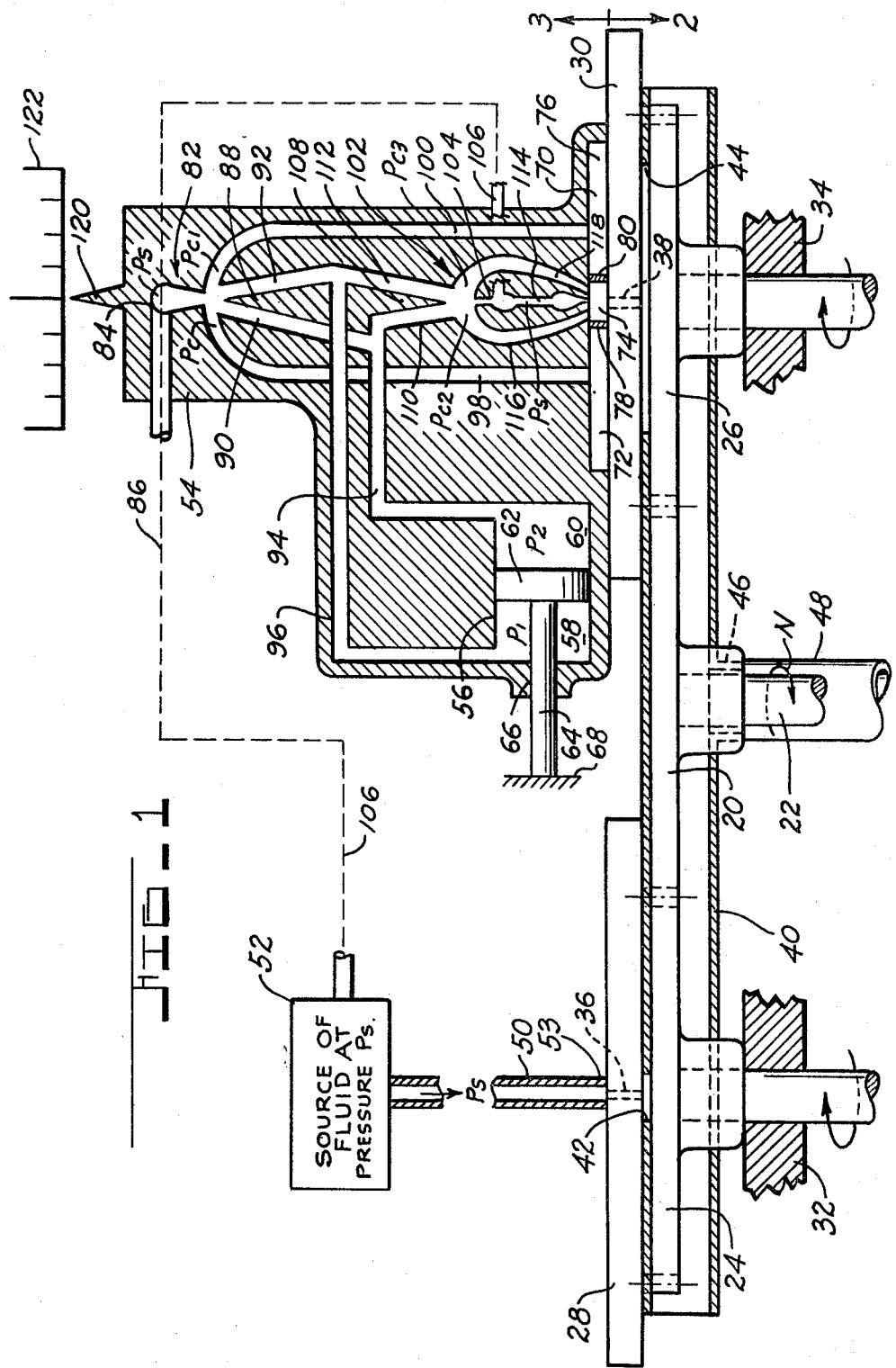

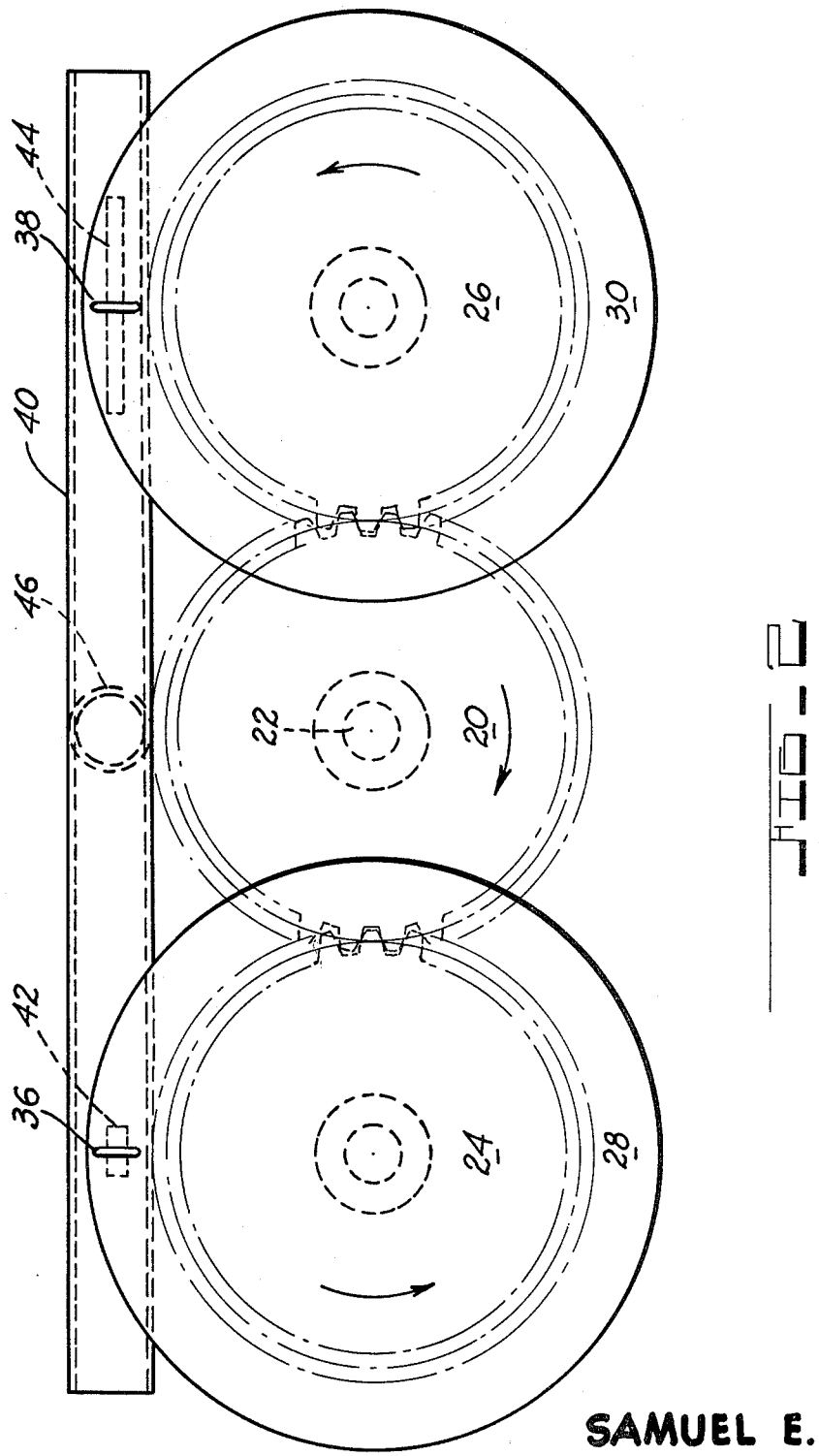

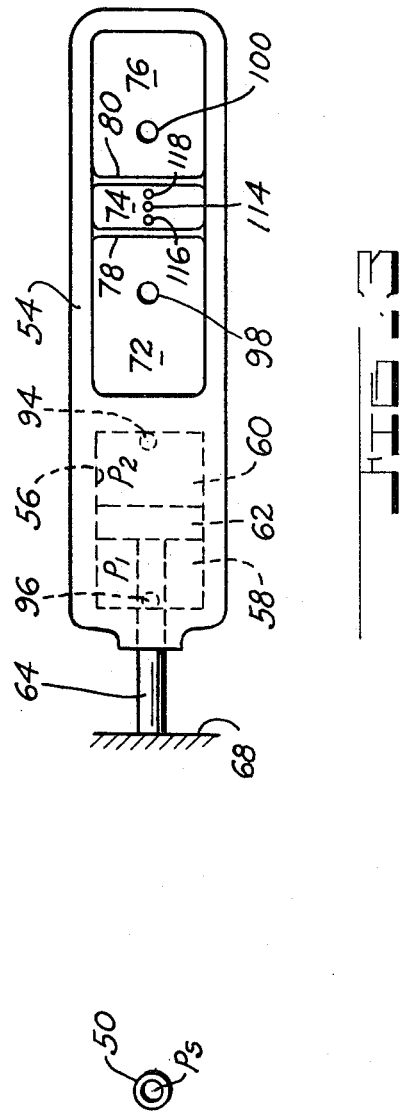

3,509,773
CONTROL APPARATUS RESPONSIVE TO SPEED, TEMPERATURE OR SPEED CORRECTED FOR TEMPERATURE
Samuel E. Arnett, South Bend, Ind., assignor to The Bendix Corporation, a corporation of Delaware
Filed Sept. 8, 1967, Ser. No. 666,325
Int. Cl. G01p 3/44; F01b 25/06
U.S. Cl. 73—509                                    12 Claims

ABSTRACT OF THE DISCLOSURE

Control apparatus provided with a gas transmitting conduit having axially spaced apart first control and second control ports. First and second rotatable driven means having associated first and second gas transmitting ports therein are driven simultaneously by a rotating member. The first gas transmitting port periodically registers with the first control port depending upon the speed of rotation of the first rotatably driven member to generate a gas pressure pulse in the conduit which pulse travels at a speed dependent upon gas temperature. The second gas transmitting port periodically registers with the second control port. The pressure pulse coincides with the second gas transmitting port at a position along the second port which, in turn receives the pulse. Movable pulse sensing means communicating with the second elongated port which is elongated in the direction of movement of the movable pulse sensing means responds to the pulse and moves relative to the second elongated port to the pulse location where the movable pulse sensing means is stabilized to provide an output position signal.

BACKGROUND OF THE INVENTION

The present invention relates to fluidic control apparatus for determining variations in a variable condition or operation or a variable condition of operation corrected for variations in a second variable condition of operation.

In the control apparatus art, various devices are used to sense a variable condition and provide an output control signal which varies as a function of the sensed condition. It is sometimes desired to sense two variable conditions and provide an output control signal which varies as a function of one variable condition corrected for variations in the second variable condition. A common practice is to use mechanical motion transmitting devices such as levers, cams, springs, etc. to translate the sensed variable conditions into corresponding output signals which, in turn, results in a relatively complicated, weighty and/or expensive arrangement of structure particularly when variable conditions such as speed of rotation of a member and/or temperature are concerned.

SUMMARY OF THE INVENTION

The relatively recent entry of fluidic devices in the control device field and the substitution of such devices for mechanical components providing similar functions in a given control system has indicated that such fluidic devices may perform as well, if not better, than the mechanical counter parts which they replace with significantly less complexity, weight and/or expense.

It is an object of the present invention to provide a speed and/or temperature sensing device which utilizes fluidic components to a significant extent thereby minimizing the number of mechanical component members.

It is another object of the present invention to provide a relatively simple and inexpensive condition sensing device of the fluidic type.

BRIEF DESCRIPTION OF THE DRAWINGS

FIG. 1 is a schematic cross sectional view of the present invention;
FIG. 2 is a view taken on line 2—2 of FIG. 1.
FIG. 3 is a view taken on line 3—3 of FIG. 1.

DESCRIPTION OF THE PREFERRED EMBODIMENT

Referring to the drawings, numeral 20 designates a rotatably mounted gear actuated by a shaft 22 which, in turn, is connected to be driven by a rotating member, not shown, the rotary speed, N, of which may vary. Gear 20 is drivably connected to first and second spaced apart rotatable gear members 24 and 26 which are provided with associated discs 28 and 30, respectively, concentric therewith and fixedly secured thereto. The gear members 24 and 26 are suitably mounted for rotation on fixed supports 32 and 34, respectively. Elongated ports 36 and 38 formed in the radially outermost portion of discs 28 and 30, respectively, extend therethrough with the major axes thereof generally extending radially relative to the respective disc 28 or 30.

A rigidly mounted open ended conduit 40 which may take the form of a round pipe, as shown, or a square pipe or similar suitable structure is provided with longitudinally spaced apart ports 42 and 44 in the wall thereof which are overlapped by discs 28 and 30, respectively and adapted to register with ports 36 and 38, respectively, at intervals during rotation of discs 28 and 30 as will be explained hereinafter. An inlet port 46 located in conduit 40 midway between ports 42 and 44 is connected to a fluid supply conduit 48 which, in turn, leads to a source of pressurized heated fluid at pressure P and temperature T.

A conduit 50 connected to a source of pressurized fluid 52 at pressure $P_s$ is arranged with its discharge end 53 fixed in position adjacent disc 28 and aligned with port 42 in conduit 40 at the opposite side of disc 28. Port 36 in disc 28 is adapted to periodically register with the discharge end 53 of conduit 50 and port 42 as disc 28 rotates to thereby establish a fluid pulse in conduit 40 which, in turn, creates a sonic wave in conduit 40 which travels therethrough toward port 44.

A casing 54 is provided with a chamber 56 which is separated into variable volume chambers 58 and 60 by a piston 62 across which a control fluid pressure differential $P_1-P_2$ is generated. The piston 62 is fixed in position via a rod 64 fixedly secured thereto and extending therefrom through an opening 66 in casing 54 into fixed engagement with an anchor member 68. The casing 54 is slidably positioned on piston 62 and rod 64 in response to the control fluid pressure differential $P_1-P_2$ generated across piston 62. The casing 54 is provided with a cavity 70 of generally rectangular shape which is separated into three chambers 72, 74 and 76 by spaced apart partitions 78 and 80. The cavity 70 is generally aligned with port 44 in conduit 40 and is closed by disc 30 which separates casing 54 from conduit 40. The port 38 in disc 30 is adapted to register with port 44 and chambers 72, 74 and 76 to thereby transmit the sonic pulse generated in conduit 40 to one of the chambers 72, 74 or 76 depending upon the position of port 38 relative to cavity 70 at the time the sonic pulse and port 38 coincide as will be described hereinafter.

A conventional pure fluid amplifier generally indicated by 82 includes a supply port 84 connected to fluid source 52 at pressure $P_s$ via passage 86 from which port 84 a power fluid jet is expelled toward a diverging splitter member 88 separating two output fluid passages 90 and 92. Output passages 90 and 92 are connected to passages 94 and 96 respectively, which, in turn, lead to respective chambers 60 and 58. The power fluid jet split by splitter member 88 may be divided into two equal flow portions, one of which passes to output passage 90 and the other of which passes to output passage 92 which, in turn, results in equal pressures $P_1$ and $P_2$ in chambers 58 and 60, respectively, causing casing 54 to remain fixed in position relative to piston 62. The power fluid jet is responsive to a fluid pressure differential $P_c-P_{c1}$, generated thereacross by opposed control fluid passages 98 and 100 leading from chambers 72 and 76, respectively, to the power fluid jet intermediate port 84 and splitter member 88. If pressure $P_c$ dominates pressure $P_{c1}$, the resulting pressure differential urges the power fluid jet toward output passage 92 causing a corresponding increase in pressure $P_1$ in chamber 58 and decrease in pressure $P_2$ in chamber 60 whereupon casing 54 moves to the left as viewed in FIG. 1. If pressure $P_{c1}$ dominates pressure $P_c$ causing the power fluid jet to shift toward passage 90, pressure $P_2$ overcomes pressure $P_1$, causing the casing 54 to move toward the right as viewed in FIG. 1.

A second conventional pure fluid amplifier generally indicated by 102 includes a supply port 104 connected to fluid source 52 at pressure $P_s$ via passage 106 from which port 104 a power fluid jet is expelled toward a splitter member 108 separating two output passages 110 and 112 connected to passages 94 and 96, respectively. A port 114 connected to supply port 104 is adapted to inject a fluid jet into chamber 74 at the mid-point thereof so that, with casing 54 positioned as shown in FIG. 1, fluid passing into chamber 74 from conduit 40 via ports 44 and 38 is split into two equal flow portions at pressures $P_{c2}$ and $P_{c3}$ by the fluid jet from port 114. Opposed control fluid passages 116 and 118 connected to chamber 74 at opposite sides of port 114 communicate with the power fluid jet intermediate port 104 and splitter member 108 thereby generating a control fluid pressure differential $P_{c2}-P_{c3}$ across the power fluid jet to shift the same toward passage 110 or 112 depending upon which pressure $P_{c2}$ or $P_{c3}$ dominates as will be described hereinafter. In the event of pressures $P_{c2}$ and $P_{c3}$ being equal as in the case of the abovementioned splitting of the flow into chamber 74 into equal flow portions, the pressure differential $P_{c2}-P_{c3}$ is zero and the power fluid jet expelled by port 104 is split into two equal flow portions by splitter member 108 one of which passes to passage 110 and the other to passage 112. From passages 110 and 112, the resulting equally pressurized fluid flows past through passages 94 and 96, respectively, to chambers 60 and 58.

The casing is provided with suitable position indicating means such as an integral indicating arm 120 movable relative to a fixed seal 122 to thereby translate movement of casing 54 into a readily observable form which scale may be calibrated in terms of temperature T, speed N or speed N corrected for temperature T as will be described hereinafter.

For explanation purposes, it will be assumed that the speed input to gear 20 is delivered from a rotating member such as a conventional gas turbine, not shown, which rotates at speed N in response to hot motive combustion gas at temperature T passing therethrough. A portion of the combustion gas at temperature T is transmitted to the conduit 40 via supply conduit 48. The source 52 represents a pressurized gas at a pressure in excess of the pressure of the combustion gas in conduit 40.

With the discs 28 and 30 rotating in unison at a constant speed in response to a given rotational speed N of the driving gear 20, the port 36 in disc 28 periodically registers with the discharge end 52 of conduit 50 and port 42 in conduit 40 causing pressure pulses to occur in conduit 40 which, in turn, create a series of sonic waves which propagate through conduit 40 toward port 44 in disc 30 at a speed proportional to $\sqrt{T}$.

It will be understood that the casing 54 as shown in FIG. 1 occupies a position corresponding to a given combustion gas temperature T variations from which are represented by movement of casing 54 to the left or right as viewed in FIG. 1 depending upon the relative temperature deviation of the combustion gas temperature T. Assuming the combustion gas temperature T to be lower than the indicated temperature T on scale 122, a sonic wave passing through conduit 40 will travel proportionally slower and coincide with port 38 in disc 30 at a point within the confines of chamber 72 whereupon a resulting pressure pulse derived from the sonic wave travels travels through port 30 into chamber 72 thereby generating a pressure $P_c$ increase in control fluid passage 98 which, in turn, generates a $P_c-P_{c1}$ pressure differential across the power fluid jet of amplifier 82. The resulting deflection of the power fluid jet toward output passage 92 causes a corresponding increase and decrease of pressures $P_1$ and $P_2$, respectively, in chambers 58 and 60 thereby causing casing 54 to move to the left as viewed in FIG. 1. As the casing 54 moves progressively to the left, the partition 78 moves to the left of the position where the port 38 and sonic wave coincide thereby diverting the pressure pulse derived from the sonic wave to chamber 74 adjacent passage 116 where a resulting increase in pressure $P_{c2}$ occurs. The increased pressure $P_{c2}$ generates a $P_{c2}-P_{c3}$ pressure differential across the power fluid jet of amplifier 102 thereby deflecting the power fluid jet toward output passage 112 thereby re-establishing the $P_1-P_2$ pressure differential previously derived from amplifier 82. It will be understood that the control fluid pressure differential $P_c-P_{c1}$ at amplifier 82 diminishes to zero when the partition 78 diverts the pressure pulse from chamber 72 to chamber 74 which, in turn, results in centering of the power fluid jet of amplifier and equal pressurization of output passages 90 and 92.

The casing 54 continues to move to the left in response to the pressure differential $P_1-P_2$ generated across piston 62 until the chamber 74 is centrally located relative to the port 38 whereupon the fluid jet emitted by port 114 splits the pulsed fluid flow passing through port 38 into chamber 74 into equal flow portions one of which passes to control passage 116 and the other to control passage 118 which, in turn, results in equal pressures $P_{c2}$ and $P_{c3}$. The pressure differential $P_{c2}-P_{c3}$ drops to zero causing the power fluid jet of amplifier 102 to center and split into equal flow portions to output passages 110 and 112 whereupon the pressure differential $P_1-P_2$ across piston 62 drops to zero thereby stabilizing casing 54. The position of casing 54 is indicated by the arm 120 relative to the scale 122 which is calibrated in terms of temperature to provide the desired temperature indication.

In the event of an increase in temperature T of the combustion gas passing through conduit 40, the sonic velocity of the pulse introduced through port 36 and propagating through the gas in conduit 40 will increase accordingly. The sonic pulse will travel farther accordingly through conduit 40 for a given time period during which time the rotating disc 30 continues to travel at a constant speed so that the sonic pulse coincides with port 38 of disc 30 at a greater distance from conduit 50 where the sonic pulse originates. Assuming the temperature T increase is sufficient to cause the sonic pulse to coincide with port 38 as port 38 registers with chamber 76, the resulting pressure pulse transmitted through port 44 of conduit 40 and port 38 of disc 30 passes to chamber 76 causing pressure $P_{c1}$ in control passage 100 to increase accordingly and overcome opposing pressure $P_c$ thereby generating a $P_{o1}-P_c$ pressure differential across the power fluid jet of amplifier 82. The power jet of amplifier 82 is deflected accordingly toward passage 90 whereupon the pressure $P_2$ in chamber 60 overcomes pressure $P_1$ in chamber 58 resulting in casing 54 moving to the right as viewed in FIG. 1. The subsequent sequence of control events is similar to that heretofore mentioned with regard to a temperature T decrease except in reverse whereby the casing ultimately is stabilized at a position toward the right as viewed in FIG. 1 to provide a position signal representing the increased temperature T.

It will be understood that, by maintaining the combustion gas temperature T at a constant value or by supplying conduit 40 from any suitable source of gas at constant temperature, the position of the casing 54 can provide a speed indication representative of variations in the gas turbine speed N. Since the sonic pulses introduced through port 42 in conduit 40 will always travel the same speed through conduit 40 for a given temperature T of the gas passing therethrough, the port 38 in disc 30 and a sonic pulse in conduit 40 will coincide at a point along conduit 40 dependent upon the speed of rotation of disc 30. The fluid pulse generated at port 42 travels at sonic velocity so that, with the port 38 in disc 30 approaching the right hand end of port 44 in conduit 40 as viewed in FIG. 1, the faster moving pulse will necessarily coincide with the port 38 at a point within the limits of port 44. Thus, for a relatively slow speed N the sonic pulse and port 38 will coincide near the right hand end of port 44 as viewed in FIG. 1 whereas for higher speeds the sonic pulse and port 38 will coincide at a point closer to the left hand end of port 44. The port 44 may be made of suitable length to accommodate the desired range of speed N. Depending upon the location of port 38 when the sonic pulse coincides therewith, one of the chambers 72, 74 or 76 will be pressurized in the hertofore mentioned manner causing the casing 54 to assume a position representative of the speed of rotation N of the gas turbine. In such a case, the scale 122 is calibrated in terms of speed N.

In the event that both combustion chamber gas temperature T and gas turbine speed N are variable, the velocity of the sonic pulse through the gas filled conduit 40 and the location of port 38 relative to the port 42 where the sonic pulse originates will both vary causing the port 38 and sonic pulse to coincide at a varying point along port 44 thereby causing the casing 54 to assume a position representative of speed N or speed N corrected as a function of $\sqrt{T}$. In such a case, the scale 122 is calibrated in terms of $N/\sqrt{T}$ to provide the appropriate output indication.

The gas flow into conduit 40 passes out of the open ends of the conduit and it will be recognized that the gas introduced through port 36 to generate the sonic pulse does not effect the temperature T of the combustion gas passing through conduit 40.

The inlet port 46 is located approximately midway between ports 42 and 44 to thereby minimize the velocity effect of the gas passing through conduit 40 by having gas flow in one half of the conduit 40 in one direction and gas flow in the other half of conduit 40 in the opposite direction. A continuous flow of gas is maintained through conduit 40 to thereby permit sensing of rapidly changing temperature of the gas.

It will be understood that other sources of gas at variable temperature may be substituted for combustion gas such as compressor inlet air or compressor discharge air and the like. Thus, the output position of arm 120 relative to scale may provide an indication of engine speed corrected for any desired engine temperature.

Various modifications and changes in the heretofore described structure may be made by those persons skilled in the art without departing from the scope of applicant's invention as defined by the following claims.

I claim:

1. Apparatus for sensing a variable condition of operation and providing an output signal which varies as a predetermined function of the sensed condition, said apparatus comprising:
   a source of pressurized fluid;
   walled conduit means connected to receive fluid from said source;
   a first port formed in said walled conduit means;
   a second port formed in said walled conduit means in axially spaced apart relationship to said first port;
   pulse generating means operatively connected to said first port for causing a periodic fluid flow therethrough to generate corresponding sonic pulses in said walled conduit means which propagate therethrough toward said second port;
   a movable casing defining first, second and third chambers arranged in spaced apart relationship;
   fluid pressure responsive means operatively connected to said casing for actuating the same;
   first fluidic amplifier means having a deflectable fluid jet, first output passage means for receiving said fluid jet, and first and second opposing control fluid passage means operatively connected to deflect said fluid jet relative to said output passage means;
   said first and second control fluid passages having fluid communication with said first and third chambers, respectively;
   second fluidic amplifier means having a deflectable fluid jet, second output passage means for receiving said fluid jet, and third and fourth opposing control fluid passages operatively connected to deflect said fluid jet relative to said second output passage means;
   said third and fourth control fluid passage means having fluid communication with said second chamber;
   fluid jet producing means operatively connected to said second chamber for injecting a fluid jet therein intermediate said third and fourth control fluid passages;
   passage means connecting said first and second output passage means to said fluid pressure responsive means for energizing said fluid pressure responsive means in response to pressurization of said first and second output passage means;
   movable means provided with a third port adapted to periodically register with said second port and one of said first, second and third chambers;
   means responsive to a variable condition of operation operatively connected to said movable means and said pulse generating means for actuating the same in timed relationship;
   said third fluid port coinciding with a sonic pulse at a point within the limits of said second port to thereby transmit a corresponding fluid pressure pulse to one of said first and third chambers depending upon the position of said third fluid port relative to said second port to pressurize the same and generate a corresponding control fluid pressure differential between said first and second control fluid passage means to which said first fluidic amplifier means responds to energize said fluid pressure means thereby actuating said movable casing relative to said walled conduit means to establish communication of said second chamber with said third fluid port whereby said fluid pressure pulse and said fluid jet injected into said second chamber coact to generate a control fluid pressure differential between said third and fourth control fluid passages to which said second amplifier means responds to energize said fluid pressure responsive means thereby actuating said movable casing;
   said movable casing being stabilized in position in response to said third fluid port moving into alignment with said fluid jet injected into said second chamber to thereby equalize the control fluid pressures at said third and fourth control fluid passages;
   said position of said movable casing providing an output signal which varies as a function of said variable condition of operation.

2. Apparatus as claimed in claim 1 wherein:
   said pressurized fluid received by said walled conduit means from said source is at a constant temperature; and
   said condition of operation is variable such that the position of said movable casing varies as a function of said condition of operation.

3. Apparatus as claimed in claim 1 wherein:

said condition of operation is a constant value; and said pressurized fluid received by said walled conduit means varies in temperature such that the position of said movable casing varies as a function of temperature of said pressurized fluid in said walled conduit.

4. Apparatus as claimed in claim 1 wherein:

said condition of operation is variable; and said pressurized fluid received by said walled conduit means varies in temperature such that the position of said movable casing varies as a function of said condition of operation and the temperature of said pressurized fluid.

5. Apparatus as claimed in claim 1 wherein:

said pulse generating means includes a passage connected to a source of pressurized fluid and adapted to discharge fluid into said first port; and movable means provided with a fourth port adapted to periodically register with said passage and said first port to generate a fluid pulse in said walled conduit means.

6. Apparatus as claimed in claim 5 wherein:

said movable means provided with said third port and said movable means provided with said fourth port are rotatable members driven in unison by said means responsive to a condition of operation;

said movable means provided with said third port being interposed between said movable casing and said second port;

said movable means provided with said fourth port being interposed between the discharge end of said passage and said first port.

7. Apparatus as claimed in claim 1 wherein:

said second port is elongated and extends axially along a wall of said conduit means, said first and third chambers are separated by said second chamber which chambers are oriented to move in the direction of elongation of said second port;

said fluid jet producing means being operative to inject a continuous stream of pressurized fluid into said second chamber.

8. Apparatus as claimed in claim 7 wherein:

said fluid pressure responsive means includes fluid pressure differential responsive means operatively connected to said movable casing;

said first and second fluidic amplifier means each having said deflectable fluid jet thereof normally split into two equal flow portions;

said first output passage means including a pair of output passages for receiving said equal flow portions associated therewith;

said second output passage means including a pair of output passages for receiving said equal flow portions associated therewith;

first passage means connecting one output fluid passage from each of said first and second output passage means with said fluid pressure differential responsive means;

second passage means connecting the other output passage from each of said first and second output passage means with said fluid pressure differential responsive means.

9. Apparatus as claimed in claim 1 wherein:

said walled conduit means is a tubular member having at least one open end.

10. Apparatus as claimed in claim 1 wherein:

said walled conduit means is a tubular member open at opposite ends.

11. Apparatus as claimed in claim 10 wherein:

said tubular member is provided with an inlet port intermediate said open ends thereof and connected to said source of pressurized fluid.

12. Apparatus as claimed in claim 1 wherein:

said condition of operation is velocity of a rotatable member.

References Cited

UNITED STATES PATENTS

| | | | |
|---|---|---|---|
| 3,395,718 | 8/1968 | Wolff | 137—12 |
| 3,260,271 | 7/1966 | Katz | 137—36 |
| 3,233,522 | 2/1966 | Stern | 137—36 |

JAMES J. GILL, Primary Examiner

H. GOLDSTEIN, Assistant Examiner

U.S. Cl. X.R.

73—521; 137—20, 26, 36, 81.5